US006244540B1

(12) United States Patent
Stabile et al.

(10) Patent No.: US 6,244,540 B1
(45) Date of Patent: Jun. 12, 2001

(54) METHOD OF CALCULATING OXYGEN REQUIRED AND SYSTEM FOR MONITORING OXYGEN SUPPLY AND/OR CALCULATING FLIGHT LEVEL AFTER EMERGENCY CABIN DECOMPRESSION

(76) Inventors: James R. Stabile, 926 Saddleback Rd., Newton, NJ (US) 07860; William I. Mack, 27 Rambling Brook Rd., Upper Saddle River, NJ (US) 07548

( * ) Notice: Subject to any disclaimer, the term of this patent is extended or adjusted under 35 U.S.C. 154(b) by 0 days.

(21) Appl. No.: 09/630,212

(22) Filed: Aug. 1, 2000

Related U.S. Application Data

(63) Continuation-in-part of application No. 09/080,187, filed on May 18, 1998, now abandoned.

(51) Int. Cl.[7] .................................................. B64D 13/02
(52) U.S. Cl. ......................................... 244/118.5; 244/194
(58) Field of Search ............................... 244/118.5, 175, 244/194, 76 R; 701/99

(56) References Cited

U.S. PATENT DOCUMENTS

| | | | |
|---|---|---|---|
| 3,922,149 | * | 11/1975 | Ruder et al. . |
| 3,981,300 | * | 9/1976 | Williams . |
| 4,024,730 | * | 5/1977 | Bell et al. . |
| 5,346,778 | * | 9/1994 | Ewan et al. . |
| 5,516,330 | * | 5/1996 | Dechow et al. . |
| 5,590,852 | * | 1/1997 | Olson . |
| 5,791,982 | * | 8/1998 | Curry et al. . |

* cited by examiner

Primary Examiner—Charles T. Jordan
Assistant Examiner—Tien Dinh
(74) Attorney, Agent, or Firm—Hopgood, Calimafde Judlowe & Mondolino

(57) ABSTRACT

A system useable in a jet aircraft having installed therein a pressurized oxygen supply which feeds oxygen into the interior of the plane when it flies at high cabin altitudes, the system indicating the changing status of the supply as oxygen is drained therefrom. The system includes a pressure transducer coupled to the supply and means associated with the transducer to determine the lapse rate at which the pressure of the supply is reduced as oxygen is drained therefrom to yield a first signal representing this pressure lapse rate, and to concurrently determine the lapse rate at which the number of liters of oxygen in the supply is reduced as oxygen is drained therefrom to yield a second signal representing the liter lapse rate. These signals are applied to a microprocessor in whose data base is entered the total oxygen inventory of the supply and the oxygen demand of the plane in which the supply is installed. When oxygen is being drained from the supply, the microprocessor calculates and reads out the prevailing supply pressure, the number of liters remaining in the supply, and the time in hours and minutes remaining before the supply is exhausted based on the current rate of oxygen consumption.

The invention provides both a method for calculating the oxygen required, as well as a real time monitoring and calculating system for emergency conditions. The invention is applicable to any pressurized gas system, such as for divers, compressed gas cooking or vehicles, therapeutic oxygen, and the like.

17 Claims, 15 Drawing Sheets

FIG. 2

PRESSURE TEMPERATURE CONVERSION CHART

| | SETTLED TEMPERATURE | | BOTTLE PRESSURE |
|---|---|---|---|
| | C | F | NTPD |
| 1 | -45 | -50 | 1272 |
| 2 | -40 | -40 | 1321 |
| 3 | -34 | -30 | 1370 |
| 4 | -29 | -20 | 1418 |
| 5 | -23 | -10 | 1467 |
| 6 | -18 | +0 | 1515 |
| 7 | -12 | +10 | 1563 |
| 8 | -7 | +20 | 1611 |
| 9 | -1 | +30 | 1660 |
| 10 | +4 | +40 | 1707 |
| 11 | +10 | +50 | 1755 |
| 12 | +16 | +60 | 1802 |
| 13 | +21 | +70 | 1850 |
| 14 | +27 | +80 | 1897 |
| 15 | +32 | +90 | 1945 |
| 16 | +38 | +100 | 1992 |
| 17 | +43 | +110 | 2039 |
| 18 | +49 | +120 | 2087 |
| 19 | +55 | +130 | 2134 |
| 20 | +60 | +140 | 2181 |
| 21 | +66 | +150 | 2228 |

CONDITION: THIS TABLE IS BASED ON THE OXYGEN SYSTEM BEING FILLED TO 1850 psi AT AN AMBIENT BOTTLE TEMPERATURE OF 70 DEGREES FAHRENHEIT NTPD (NATIONAL TEMPERATURE PRESSURE DRY)

FIG. 3

Liters used by one flight crewperson with mask sealed.

| CABIN ALTITUDE (FEET) | 1 (Hr) | 2 (HRS) | 3 (HRS) | 4 (HRS) | 5 (HRS) | 6 (HRS) | 7 (HRS) | 8 (HRS) |
|---|---|---|---|---|---|---|---|---|
| 5000 | 247 | 493 | 740 | 986 | 1233 | 1480 | 1726 | 1973 |
| 6000 | 225 | 450 | 675 | 900 | 1125 | 1350 | 1575 | 1800 |
| 7000 | 210 | 420 | 630 | 840 | 1050 | 1260 | 1470 | 1680 |
| 8000 | 174 | 348 | 522 | 696 | 870 | 1044 | 1218 | 1392 |
| 9000 | 154 | 307 | 461 | 614 | 768 | 922 | 1075 | 1229 |
| 10000 | 132 | 264 | 396 | 528 | 660 | 792 | 924 | 1056 |

Therapeutic Oxygen

Liters used by PAX based on 0.00 LPM.

| No. PAX | 1 (HR) | 2 (HRS) | 3 (HRS) | 4 (HRS) | 5 (HRS) | 6 (HRS) | 7 (HRS) |
|---|---|---|---|---|---|---|---|
| 1 | 0 | 0 | 0 | 0 | 0 | 0 | 0 |
| 2 | 0 | 0 | 0 | 0 | 0 | 0 | 0 |

FIG. 4

OXYGEN INVENTORY

| TWO 115 CUBIC FOOT BOTTLES ||
|---|---|
| PRESSURE (PSI) | CAPACITY (LITERS) |
| 1850 | 6509 |
| 1800 | 6333 |
| 1750 | 6157 |
| 1700 | 5981 |
| 1650 | 5805 |
| 1600 | 5629 |
| 1550 | 5453 |
| 1500 | 5278 |
| 1450 | 5102 |
| 1400 | 4926 |
| 1350 | 4750 |
| 1300 | 4574 |
| 1250 | 4398 |
| 1200 | 4222 |
| 1150 | 4046 |
| 1100 | 3870 |
| 1050 | 3694 |
| 1000 | 3518 |
| 950 | 3342 |
| 900 | 3167 |
| 850 | 2991 |
| 800 | 2815 |
| 750 | 2639 |
| 700 | 2463 |
| 650 | 2287 |
| 600 | 2111 |
| 550 | 1935 |
| 500 | 1759 |
| 450 | 1583 |
| 400 | 1407 |
| 350 | 1231 |
| 300 | 1056 |
| 250 | 880 |
| 200 | 704 |

FIG. 5A

OXYGEN DURATION FLIGHT LEVEL 250

| NTPD | LTRS | CREW SYSTEM |
|---|---|---|
| 1850 | 1415 | 2:41 |
| 1800 | 1377 | 2:36 |
| 1700 | 1300 | 2:28 |
| 1600 | 1224 | 2:19 |
| 1500 | 1147 | 2:10 |
| 1400 | 1071 | 2:01 |
| 1300 | 994 | 1:53 |
| 1200 | 918 | 1:44 |
| 1100 | 841 | 1:35 |
| 1000 | 765 | 1:27 |
| 900 | 688 | 1:18 |
| 800 | 612 | 1:09 |
| 700 | 535 | 1:00 |
| 600 | 459 | :52 |
| 500 | 382 | :43 |
| 400 | 306 | :34 |
| 300 | 229 | :26 |
| 200 | 153 | :17 |
| CREW | | 2 |

REDUCTION TO O2 INVENTORY
CLIMB TO FL. 250

| REDUCTION | 311 |
|---|---|

FIG. 5B

| OXYGEN DURATION FLIGHT LEVEL 200 | | |
|---|---|---|
| NTPD | LTRS | CREW SYSTEM |
| 1850 | 1415 | 3:38 |
| 1800 | 1377 | 3:32 |
| 1700 | 1300 | 3:20 |
| 1600 | 1224 | 3:08 |
| 1500 | 1147 | 2:57 |
| 1400 | 1071 | 2:45 |
| 1300 | 994 | 2:33 |
| 1200 | 918 | 2:21 |
| 1100 | 841 | 2:09 |
| 1000 | 765 | 1:58 |
| 900 | 688 | 1:46 |
| 800 | 612 | 1:34 |
| 700 | 535 | 1:22 |
| 600 | 459 | 1:10 |
| 500 | 382 | :58 |
| 400 | 306 | :47 |
| 300 | 229 | :35 |
| 200 | 153 | :23 |
| CREW | | 2 |

REDUCTION TO O2 INVENTORY
CLIMB TO FL. 200

| REDUCTION | 280 |
|---|---|

FIG. 6A

OXYGEN DURATION FLIGHT LEVEL 250

| NTPD | LTRS | PASSENGERS | | | | | | | | |
|------|------|---|---|---|---|---|---|---|---|---|
| | | 1 | 2 | 3 | 4 | 5 | 6 | 7 | 8 | 9 | 
| 1850 | 6510 | 38:04 | 19:02 | 12:41 | 9:31 | 7:36 | 6:20 | 5:26 | 4:45 | 4:13 | 3:48 |
| 1800 | 6334 | 37:02 | 18:31 | 12:20 | 9:15 | 7:24 | 6:10 | 5:17 | 4:37 | 4:06 | 3:42 |
| 1700 | 5982 | 34:58 | 17:29 | 11:39 | 8:44 | 6:59 | 5:49 | 4:59 | 4:22 | 3:53 | 3:29 |
| 1600 | 5630 | 32:55 | 16:27 | 10:58 | 8:13 | 6:35 | 5:29 | 4:42 | 4:06 | 3:39 | 3:17 |
| 1500 | 5278 | 30:51 | 15:25 | 10:17 | 7:42 | 6:10 | 5:08 | 4:24 | 3:51 | 3:25 | 3:05 |
| 1400 | 4926 | 28:48 | 14:24 | 9:36 | 7:12 | 5:45 | 4:48 | 4:06 | 3:36 | 3:12 | 2:52 |
| 1300 | 4575 | 26:45 | 13:22 | 8:55 | 6:41 | 5:21 | 4:27 | 3:49 | 3:20 | 2:58 | 2:40 |
| 1200 | 4223 | 24:41 | 12:20 | 8:13 | 6:10 | 4:56 | 4:06 | 3:31 | 3:05 | 2:44 | 2:28 |
| 1100 | 3871 | 22:38 | 11:19 | 7:32 | 5:39 | 4:31 | 3:46 | 3:14 | 2:49 | 2:30 | 2:15 |
| 1000 | 3519 | 20:34 | 10:17 | 6:51 | 5:08 | 4:06 | 3:25 | 2:56 | 2:34 | 2:17 | 2:03 |
| 900  | 3167 | 18:31 | 9:15  | 6:10 | 4:37 | 3:42 | 3:05 | 2:38 | 2:18 | 2:03 | 1:51 |
| 800  | 2815 | 16:27 | 8:13  | 5:29 | 4:06 | 3:17 | 2:44 | 2:21 | 2:03 | 1:49 | 1:38 |
| 700  | 2463 | 14:24 | 7:12  | 4:48 | 3:36 | 2:52 | 2:24 | 2:03 | 1:48 | 1:36 | 1:26 |
| 600  | 2111 | 12:20 | 6:10  | 4:06 | 3:05 | 2:28 | 2:03 | 1:45 | 1:32 | 1:22 | 1:14 |
| 500  | 1759 | 10:17 | 5:08  | 3:25 | 2:34 | 2:03 | 1:42 | 1:28 | 1:17 | 1:08 | 1:01 |
| 400  | 1408 | 8:14  | 4:07  | 2:44 | 2:03 | 1:38 | 1:22 | 1:10 | 1:01 | :54  | :49  |
| 300  | 1056 | 6:10  | 3:05  | 2:03 | 1:32 | 1:14 | 1:01 | :52  | :46  | :41  | :37  |
| 200  | 704  | 4:07  | 2:03  | 1:22 | 1:01 | :49  | :41  | :35  | :30  | :27  | :24  |
| PASSENGERS | | 1 | 2 | 3 | 4 | 5 | 6 | 7 | 8 | 9 | 10 |

REDUCTION TO O2 INVENTORY
CLIMB TO FL. 250

| REDUCTION | 765 | 826 | 886 | 947 | 1008 | 1069 | 1130 | 1191 | 1251 | 1312 |

FIG. 6B

OXYGEN DURATION FLIGHT LEVEL 200

| NTPD | LTRS | PASSENGERS | | | | | | | | | |
|---|---|---|---|---|---|---|---|---|---|---|---|
| | | 1 | 2 | 3 | 4 | 5 | 6 | 7 | 8 | 9 | 10 |
| 1850 | 6510 | 44:39 | 22:19 | 14:53 | 11:09 | 8:55 | 7:26 | 6:22 | 5:34 | 4:57 | 4:27 |
| 1800 | 6334 | 43:26 | 21:43 | 14:28 | 10:51 | 8:41 | 7:14 | 6:12 | 5:25 | 4:49 | 4:20 |
| 1700 | 5982 | 41:01 | 20:30 | 13:40 | 10:15 | 8:12 | 6:50 | 5:51 | 5:07 | 4:33 | 4:06 |
| 1600 | 5630 | 38:36 | 19:18 | 12:52 | 9:39 | 7:43 | 6:26 | 5:30 | 4:49 | 4:17 | 3:51 |
| 1500 | 5278 | 36:12 | 18:06 | 12:04 | 9:03 | 7:14 | 6:02 | 5:10 | 4:31 | 4:01 | 3:37 |
| 1400 | 4926 | 33:47 | 16:53 | 11:15 | 8:26 | 6:45 | 5:37 | 4:49 | 4:13 | 3:45 | 3:22 |
| 1300 | 4575 | 31:22 | 15:41 | 10:27 | 7:50 | 6:16 | 5:13 | 4:28 | 3:55 | 3:29 | 3:08 |
| 1200 | 4223 | 28:57 | 14:28 | 9:39 | 7:14 | 5:47 | 4:49 | 4:08 | 3:37 | 3:13 | 2:53 |
| 1100 | 3871 | 26:33 | 13:16 | 8:51 | 6:38 | 5:18 | 4:25 | 3:47 | 3:19 | 2:57 | 2:39 |
| 1000 | 3519 | 24:08 | 12:04 | 8:02 | 6:02 | 4:49 | 4:01 | 3:26 | 3:01 | 2:40 | 2:24 |
| 900 | 3167 | 21:43 | 10:51 | 7:14 | 5:25 | 4:20 | 3:37 | 3:06 | 2:42 | 2:24 | 2:10 |
| 800 | 2815 | 19:18 | 9:39 | 6:26 | 4:49 | 3:51 | 3:13 | 2:45 | 2:24 | 2:08 | 1:55 |
| 700 | 2463 | 16:53 | 8:26 | 5:37 | 4:13 | 3:22 | 2:48 | 2:24 | 2:06 | 1:52 | 1:41 |
| 600 | 2111 | 14:28 | 7:14 | 4:49 | 3:37 | 2:53 | 2:24 | 2:04 | 1:48 | 1:36 | 1:26 |
| 500 | 1759 | 12:03 | 6:01 | 4:01 | 3:00 | 2:24 | 2:00 | 1:43 | 1:30 | 1:20 | 1:12 |
| 400 | 1408 | 9:39 | 4:49 | 3:13 | 2:24 | 1:55 | 1:36 | 1:22 | 1:12 | 1:04 | :57 |
| 300 | 1056 | 7:14 | 3:37 | 2:24 | 1:48 | 1:26 | 1:12 | 1:02 | :54 | :48 | :43 |
| 200 | 704 | 4:49 | 2:24 | 1:36 | 1:12 | :57 | :48 | :41 | :36 | :32 | :28 |

PASSENGERS

REDUCTION TO O2 INVENTORY CLIMB TO FL. 200

| REDUCTION | 755 | 806 | 857 | 907 | 958 | 1009 | 1060 | 1111 | 1162 | 1213 |
|---|---|---|---|---|---|---|---|---|---|---|

FIG. 8

| HIGH ALTITUDE ETP | | DISTANCE BETWEEN SUITABLE AIRPORTS 1715NM | |
|---|---|---|---|
| DISTANCE 764NM | TAS 459 KTS | CONTINUE TO EINN | RETURN TO CYOX |
| LATITUDE 52.506N | LONGITUDE 35.16OW | DISTANCE 951NM | DISTANCE 764NM |
| TIME TO ETP: 1:30 | @ COAST OUT | GROUND SPEED 506KTS | GROUND SPEED 406KTS |
| TIME TO CONTINUE AND RETURN: 1:52 | | COURSE 85° | COURSE 265° |

| FLIGHT LEVEL 250 ETP | | | |
|---|---|---|---|
| DISTANCE 727NM | TAS 326 KTS | CONTINUE TO EINN | RETURN TO CYOX |
| LATITUDE 52.438N | LONGITUDE 36.16W | DISTANCE 988NM | DISTANCE 727NM |
| TIME TO ETP: 1:26 | @ COAST OUT | GROUND SPEED 373 KTS | GROUND SPEED 274 KTS |
| TIME TO CONTINUE AND RETURN: 2:38 | ALTITUDE CRUISE SPEED | COURSE 85° | COURSE 265° |

| FLIGHT LEVEL 200 ETP | | | |
|---|---|---|---|
| DISTANCE 716NM | TAS 304 KTS | CONTINUE TO EINN | RETURN TO CYOX |
| LATITUDE 52.418N | LONGITUDE 36.334W | DISTANCE 999NM | DISTANCE 716NM |
| TIME TO ETP: 1:24 | @ COAST OUT | GROUND SPEED 354 KTS | GROUND SPEED 254 KTS |
| TIME TO CONTINUE AND RETURN: 2:49 | ALTITUDE CRUISE SPEED | COURSE 85° | COURSE 265° |

| FLIGHT LEVEL 150 ETP | | | |
|---|---|---|---|
| DISTANCE 744NM | TAS 285 KTS | CONTINUE TO EINN | RETURN TO CYOX |
| LATITUDE 52.471N | LONGITUDE 35.482W | DISTANCE 971NM | DISTANCE 744NM |
| TIME TO ETP: 1:28 | @ COAST OUT | GROUND SPEED 323 KTS | GROUND SPEED 247 KTS |
| TIME TO CONTINUE AND RETURN: 3:00 | ALTITUDE CRUISE SPEED | COURSE 85° | COURSE 265° |

| FLIGHT LEVEL 100 ETP | | | |
|---|---|---|---|
| DISTANCE 778NM | TAS 269 KTS | CONTINUE TO EINN | RETURN TO CYOX |
| LATITUDE 52.530N | LONGITUDE 34.530W | DISTANCE 937NM | DISTANCE 778NM |
| TIME TO ETP: 1:32 | @ COAST OUT | GROUND SPEED 294 KTS | GROUND SPEED 244 KTS |
| TIME TO CONTINUE AND RETURN: 3:11 | ALTITUDE CRUISE SPEED | COURSE 85° | COURSE 265° |

METHOD OF CALCULATING OXYGEN REQUIRED AND SYSTEM FOR MONITORING OXYGEN SUPPLY AND/OR CALCULATING FLIGHT LEVEL AFTER EMERGENCY CABIN DECOMPRESSION

This application is a continuation in part of Ser. No. 09/080187, filed May 18, 1998 abandoned.

BACKGROUND OF INVENTION

1. Field of Invention

This invention relates generally to a system associated with a gas supply which is adapted to monitor the supply and to indicate its status as gas is drained therefrom, and more particularly, to a system of this type which is installed in a jet aircraft provided with an oxygen supply that is drained only when the plane flies at high cabin altitudes, the system in a dynamic displaying the time in hours and minutes that remain before the oxygen is exhausted based on the current rate of oxygen consumption, while in a static mode the system refers to a database to predict duration based on existing conditions.

2. Status of Prior Art

In propeller-driven aircraft, the propulsion medium is ambient air that is accelerated to the rear of the plane by the action of the rotating propeller. Hence, propeller-driven planes (other than turboprops) do not function efficiently at high altitudes where the propulsion medium is relatively tin.. But a jet aircraft depends on jet propulsion created by a force developed in reaction to the ejection of a high-velocity jet of gas. In the combustion chamber of a jet propulsion engine, combustion of the fuel mixture generates expanding gases which are discharged through an orifice to form the jet. Hence in a jet plane with a bypass engine, where ambient air is not the propulsion medium, the ambient air impedes the forward motion of the plane unless it is bypassed around the combustion zone (that is, the air is funnelled through the engine so that the total mass flow rate through the engine is increased, and hence more thrust is developed).

When a jet plane flies at high altitudes, 35,000 ft (FL 350) for commercial jets and 41,000 ft. (FL 410), the FAA regulations set forth that at least one pilot must have a mask on and be breathing oxygen. Further, the FAA regulations prescribe quantity of oxygen required for the passengers in the cabin and for the flight crew in the flight deck or cockpit. It is for this reason that all commercial jet aircraft are provided with a pressurized oxygen supply in the form of cylinders or bottles. The magnitude of the supply depends on the size of the plane. For example a B-757 jet plane has a single 115 cubic foot oxygen bottle installed thereon which when full has a gas pressure of 1850 psi. On the other hand a B-747 plane has seven such bottles installed thereon. And on a Falcon 50 jet plane there is only one 76.6 cubic foot bottle of oxygen which when the bottle is full has a pressure of 1850 psi. Oxygen canisters (bottles) for aviation are typically cited in pounds per square inch (gauge) of pressure ("psi"), at NTPD (National Temperature Pressure Dry), while oxygen flows for breathing are typically measured volumetrically, usually liters per minute. The oxygen in the canister is supplied to one or more manifolds from where it is distributed to the pilots, crew, and passengers.

The present practice in a jet plane is to provide the oxygen supply installed therein with a pressure gauge coupled to an indicator which informs the pilot in the cockpit of the prevailing pressure of the supply; some systems also compensate for the temperature of the oxygen canister. If when the flight starts and there is 1850 psi in the canister, and sometime later there the reading is 1300 psi, the pilot knows there is less oxygen but does not have a clear indication of the duration of oxygen remaining. What the pressure gauge does not inform the pilot, yet is important that he know, is exactly how much time remains before the oxygen supply is insufficient to meet the oxygen demand of the particular flight. This demand depends not only on the size of the plane and its passenger capacity, but on the actual number of passengers and crew in the flight, and on the type of oxygen masks being used. For example, those used in emergencies when a cabin depressurizes (the yellow-colored drop down masks) are activated by pulling on the mask and the flow is through a fixed valve; thus, the flow through the mask is a function solely of the differential between the oxygen pressure in the manifold and ambient pressure (so more flows as the altitude increases). One the other hand, pilots' masks have demand regulators, so that often the pilots must use reverse breathing (that is, the oxygen is forced under pressure through the mask into the pilot's lungs, and he must force out his exhalation). Accordingly, a pressure gauge reading does not inform the pilot of a jet plane as to the duration of the oxygen supply. It is therefore the present practice to furnish a jet plane pilot with a printed chart or table which he can on occasion consult to determine for a given number of passengers and crew on a particular flight and for a given full supply of oxygen, how much time remains before this supply of oxygen runs out. In fact, each jet plane will have a different oxygen supply system, with different numbers or configurations of manifolds, and different types of regulator masks for pilots.

Pilots, for each flight, are required to plan for sufficient oxygen on board for a worse case scenario. For example, for a flight from New York City to London, most of the trip is over the Atlantic ocean, and the "worst case" is a depressurization at the Equal Time Point (ETP), the point at which the Estimated Time Enroute (ETE) retuning to the nearest diversion airport or continuing to the nearest diversion airport is the same. Based on actual wind and weather conditions, the plane has an effective Ground Speed Return (GSR, returning to the last diversion airport passed) and an effective Ground Speed Continue (GSC, continuing to the nearest diversion airport). ETP can be calculated as $$ETP=(D \times GSR) \div (GSC+GSR)$$

where D is the distance between the GSR diversion airport and the GSC diversion airport (typically measured in nautical miles). The ETP can usually be derived from a computerized flight plan.

Fortunately, the problem of sudden cabin depressurization, to extent of oxygen requirements, is less problematic in a commercial airliner. Oxygen is only required, by FAA regulations, for flight levels above 10,000 ft. (FL 100). Commercial airliners typically carry sufficient fuel so that, after a catastrophic depressurization, they can make an emergency descent to 10,000 ft. and continue or return at that level, avoiding the need for oxygen during the entire ETE to the diversion airport.

The real problem occurs with private (e.g., corporate) jets, where the luxury of uploading sufficient fuel to fly at 10,000 ft. to a diversion airport is lacking. If there is a sudden depressurization and after emergency descent to FL 100 there is sufficient fuel to travel to a diversion airport at FL 100, the problem is averted. Otherwise, the plane must climb to increase the Specific Range (SR). Accordingly, the pilot(s) must calculate, based on the performance charts for the specific aircraft being flown, the minimum altitude at which the SR is sufficient to reach the diversion airport. The higher the altitude, the farther the SR; however, fuel usage increases slightly as altitude increases. Most importantly, at FL greater than 100, oxygen is required for the crew and passengers. Also, wind speed varies as a function of altitude, so a higher altitude may encounter a higher head (or tail) wind speed. Accordingly, in an emergency situation there is a tradeoff among fuel available, altitude (SR), and oxygen available. Unfortunately, determining the altitude for a sufficient SR and the oxygen available is an iterative process, and the time for these calculations is not during a catastrophic depressurization in the middle of the night over water. Additionally, after the decompression, the pilot(s) must determine an operating window to fly to one or two preplanned diversion airports (or, perhaps, an unplanned diversion airport); while the pilot(s) regains control of the aircraft and stabilizes the situation, the jet is still continuing on its flight path, and so is using fuel, oxygen, and changing the distances between it and the diversion airports, further effecting calculations of the operating window.

Ruder, U.S. Pat. No. 3,922,149, is directed to eliminating tanks of stored oxygen by providing an oxygen enrichment system that uses a molecular sieve that absorbs oxygen the least, and hence enriches the oxygen content of the sieve effluent stream.

Bishaf, U.S. Pat. No. 3,875,801 which discloses a pressurized gas tank to supply oxygen to a scuba diver, the gas being depleted at a variable rate. In Bishaf, the amount of gas remaining in the tank is displayed "in terms of the amount of time until depletion." In the Bishaf system, a transducer placed within the gas tank produces an electrical signal indicative of the instantaneous gas pressure. The signal is applied to an integrated circuit chip what develops a signal proportional to, the rate of change of the instantaneous pressure.

Schmitt, U.S. Pat. No. 4,485,669, is directed to a device for determining the timely delivery of compressed gas from compressed gas canisters, and especially for the ejection of weapons in a submarine, to assure proper ejection velocity at all depths at which the submarine may be operating.

Erickson, U.S. Pat. No. 4,408,484, discloses a temperature compensated gauge for pressurized gas, especially for natural gas fuel for vehicles or homes.

SUMMARY OF THE INVENTION

In view of the foregoing one object of this invention is to provide, in association with a supply of pressurized gas, a system adapted to monitor the drain of the gas from the supply and to indicate the time which remains before the supply is depleted. More particularly, an object of this invention is to provide a system of the above type which is useable in connection with an oxygen supply installed on a jet aircraft to feed oxygen into the interior of the plane when it flies at high altitudes. The system indicates the time remaining before the supply is depleted whereby the pilot has time to take the plane to a lower altitude at which there is no need for oxygen.

Also an object of the invention is to provide a system of the above type in which on the flight deck of the jet plane there are displayed the prevailing pressure of oxygen in the supply, the number of liters of oxygen remaining in the supply, and the time remaining before the supply is depleted.

Yet another object of the invention is to provide a computerized system of the above type which is reliable in operation and affords correct readings.

Still a further object of the invention is to provide a system by which, after an emergency or catastrophic depressurization of a jet cabin, a window of operation is provided to the pilot(s) based on fuel, flight level, and oxygen stores, to reach the nearest diversion airport. In various embodiments, the pilot(s) can be provided with a readout of suitable parameters to continue the flight, and/or can be provided with a graphical display based on the foregoing parameters.

Briefly stated, these objects are attained in a system useable in a jet aircraft having installed therein a pressurized oxygen supply which feeds oxygen into the interior of the plane when it flies at high cabin altitudes, the system indicating the changing status of the supply as oxygen is drained therefrom. The system includes a pressure transducer coupled to the supply and means associated with the transducer to determine the lapse rate at which the pressure of the supply is reduced as oxygen is drained therefrom to yield a first signal representing this pressure lapse rate, and to concurrently determine the lapse rate at which the number of liters of oxygen in the supply is reduced as oxygen is drained therefrom to yield a second signal representing the liters lapse rate. These signals are applied to a microprocessor in whose data base is entered the total oxygen inventory of the supply and the oxygen demand of the plane in which the supply is installed. When oxygen is being drained from the supply, the microprocessor calculates and reads out the prevailing supply pressure, the number of liters remaining in the supply, and the time in hours and minutes remaining before the supply is exhausted based on the current rate of oxygen consumption. The amount of oxygen can be corrected for temperature. The fuel remaining and the distances to the diversion airports can be included in the calculations.

The system described herein is by no means limited to this particular application, for it is applicable to any pressurized gas supply whose operator must monitor the supply and know how much time remains before the supply is depleted. Thus oxygen supplies used in hospitals and helium supplies used in dental offices can be monitored by a system in accordance with the invention, as well as oxygen-acetylene supplies used by welders, air/oxygen tanks used by divers (in which depth monitoring (analogous to SR) and depressurization time (analogous to fuel) are input to the system), and the like systems.

BRIEF DESCRIPTION OF DRAWINGS

For a better understanding of the invention as well as other objects and further features thereof, reference is made to the following detailed description to be read in conjunction with the accompanying drawings, wherein:

FIG. 2 is a table showing pressure correction of temperature for oxygen (gas);

FIG. 3 is a table showing oxygen consumption for a crew member (pilot) in a Challenger model CL601-3A jet at the effective cabin altitude shown, pursuant to FAA regulations and a table depicting therapeutic oxygen consumption in liters having a higher than normal flowrate;

FIG. 4 is a table showing the oxygen capacity in liters as a function of NTPD pressure of two 115 ft.$^3$ oxygen canisters;

FIGS. 5A and 5B are tables showing the duration of oxygen usable by a crew of two in a Challenger model CL601-3A jet as a function of NTPD or liters at FL 250 (5A) and FL 200 (5B);

FIGS. 6A and 6B are tables showing the duration of oxygen usable by a given number of passengers in a Challenger model CL601-3A jet as a function of NTPD or liters at FL 250 (6A) and FL 200 (6B);

FIG. 8 is a graphical display, such as on a computer readout, of ETPs over the Atlantic ocean at various flight levels (FLs);

DESCRIPTION OF SPECIFIC EMBODIMENTS OF THE INVENTION

Manual System

Figure 1:
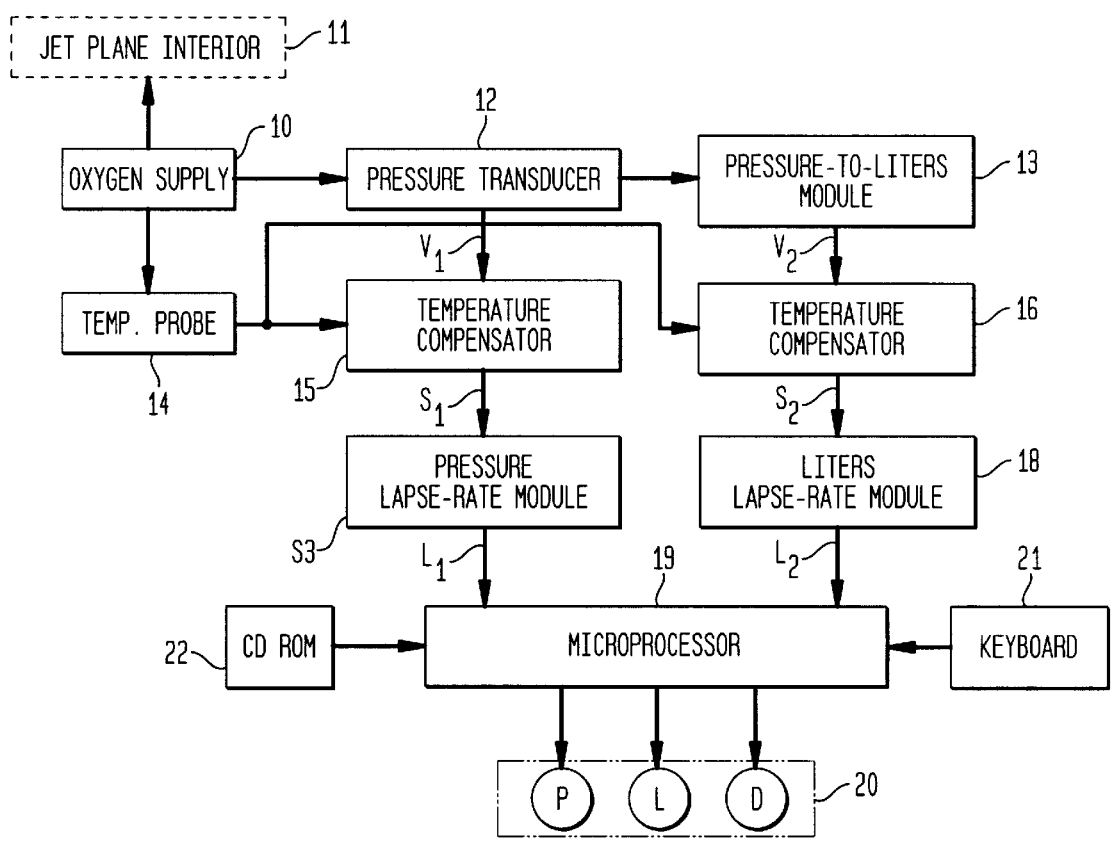
FIG. 1 is a block diagram of a pressure monitoring, temperature-compensated system for determining oxygen lapse rate and time remaining.

Before addressing the present invention, it is useful to understand how a pilot should determine, the total amount of oxygen that should be carried on board, including planning for an emergency/catastrophic cabin decompression, to have a suitable operating window (fuel, SR, and oxygen) to safely divert to an alternate airport. The following procedure is not necessarily done, and does form in integral part of this invention because typically the pilot only estimates the amount of oxygen that should be required for the flight, and then not always assuming a worst case emergency scenario.

Prior to departing, the pilot must first calculate the amount of oxygen that would normally be required for the flight. FIG. 2 depicts a pressure-temperature conversion chart based on an oxygen system filled to 1850 psi at 21° C. (70° F.), which is the normal assumed temperature, although a flight from the tropics or the desert may typically be at 90° F. on average and one near the artic circle may be more likely at 40° on average.

As noted above, FAR (federal aviation regulations) require that a commercial flight above 410 FL have a pilot breathing oxygen at all times. At flight levels above FL 100, each plane is designed to have an effective cabin altitude somewhere between FL 50 and FL 100 regardless of the altitude. FIG. 3 is a table showing the oxygen consumption in liters per hour for a crew member (pilot) in a Challenger model CL601-3A jet at a given effective cabin altitude. Also shown in FIG. 3 is a therapeutic oxygen table, and this particular aircraft does not have a therapeutic oxygen outlet (which is a connection taken typically taken from the manifold for the passenger emergency oxygen and supplied on a demand basis at a rate typically greater than for the passenger emergency oxygen). Typically, the effective cabin altitude is about 5000 to 8500 feet, and more typically at 7000 to 8000 feet; the pilot will (should) know the manufacturer's specification for that particular plane.

FIG. 4 is a table showing the oxygen capacity in liters as a function of NTPD pressure of two 115 ft.$^3$ oxygen canisters, which should be corrected by the temperature in FIG. 2.

During an uneventful flight, the oxygen requirement will be the sum of that required above FL 410 (as shown in FIG. 3), any therapeutic oxygen required (i.e., a passenger requiring oxygen during the entire trip), and any needed for an emergency descent to FL 100 (at which level oxygen is not required; see the bottoms of FIGS. 5A/5B and 6A/6B, which include the emergency descent oxygen for the listed passengers plus a crew of two, and are discussed in more detail below). This is then the minimum amount of oxygen that should be carried onboard. For example, a flight having two pilots and an effective cabin pressure of 7000 ft. for 3 hrs, no passengers on therapeutic oxygen, and six passengers, would require about 1260 liters (FIG. 3) plus more than 1069 liters (FIG. 6A) of oxygen, so a safe estimate would be about 2330 liters of oxygen.

Additionally, the pilot must plan for an emergency at the ETP. The flight plan provides (and the pilot can always determine later, prior to departure) the actual wind conditions, and typically provides the ETP (or it can be derived) and the amount of fuel remaining at the ETP. Based on the amount of fuel remaining at the ETP and the known time (via ETP) to reach a diversion airport, the pilot must determine the altitude at which the jet must fly to have an SR sufficient to reach either diversion airport at the ETP. Knowing the altitude required to have a sufficient SR to reach the diversion airport, the oxygen requirement will be defined. This oxygen requirement should then be added to that determined for an uneventful flight.

In reality, after an emergency descent, the jet will climb to an altitude sufficient to provide an SR effective to reach a diversion airport. The charts shown in FIGS. 5A and 5B are tables showing the duration of oxygen usable by a crew of two in a Challenger model CL601-3A jet as a function of NTPD or liters at FL 250 (5A) and FL 200 (5B). FIGS. 6A and 6B are tables showing the duration of oxygen usable by a given number of passengers in a Challenger model CL601-3A jet as a function of NTPD or liters at FL 250 (6A) and FL 200 (6B); recall that pilots' masks are regulated whereas passengers' emergency masks are unregulated, fixed valve devices. Thus, if the flight plan estimates that the ETP is 1:30 hrs. and the pilot knows that if there were an emergency at the ETP he would have to fly at FL 250 to reach a diversion airport, the additional oxygen would be the 770 liters shown in FIG. 5A (note that interpolation must be done from the time of 1:30 to determine the liters required), plus 1549 liters from FIG. 6A (again interpolating from the time of 1:30 using the column for six passengers).

Thus, the total calculated oxygen is 2330 (normal operations plus emergency descent) plus 770 plus 1549, for a total of 4649 liters. Also, under 200 psi there is no useful amount of oxygen supplied, so at 70° F. an additional 350 liters of oxygen must be added. Hence, the total oxygen required, including that for "expected" emergencies is about 5000 liters. Looking at FIG. 4, this would require two 115 cu. ft. canisters at about 1421 psi.

Figure 7A:
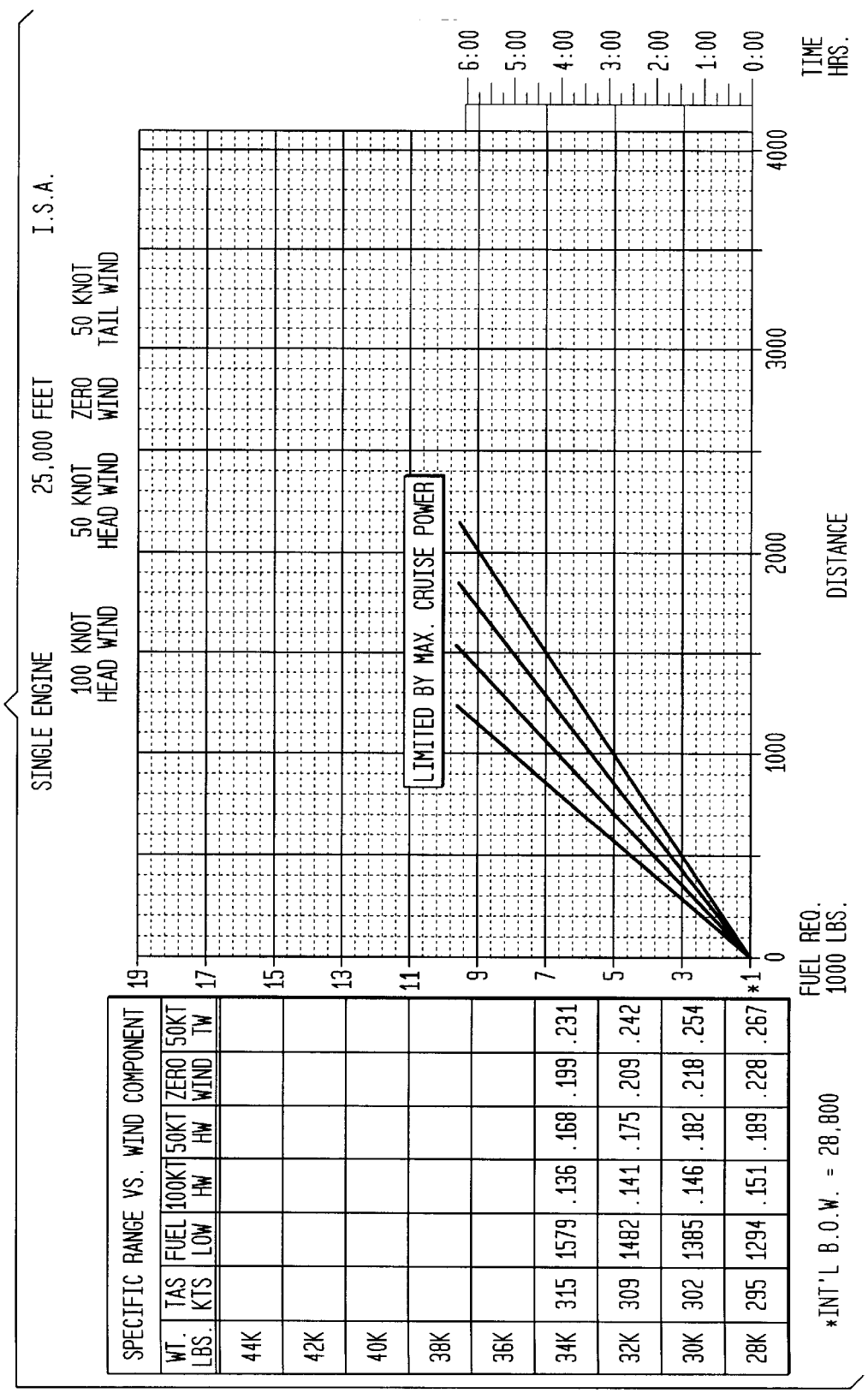
FIGS. 7A and 7B are tables showing the performance curves for General Electric CF34-3A engines at FL 250 (7A) and FL 200 (7B)
Figure 7B:
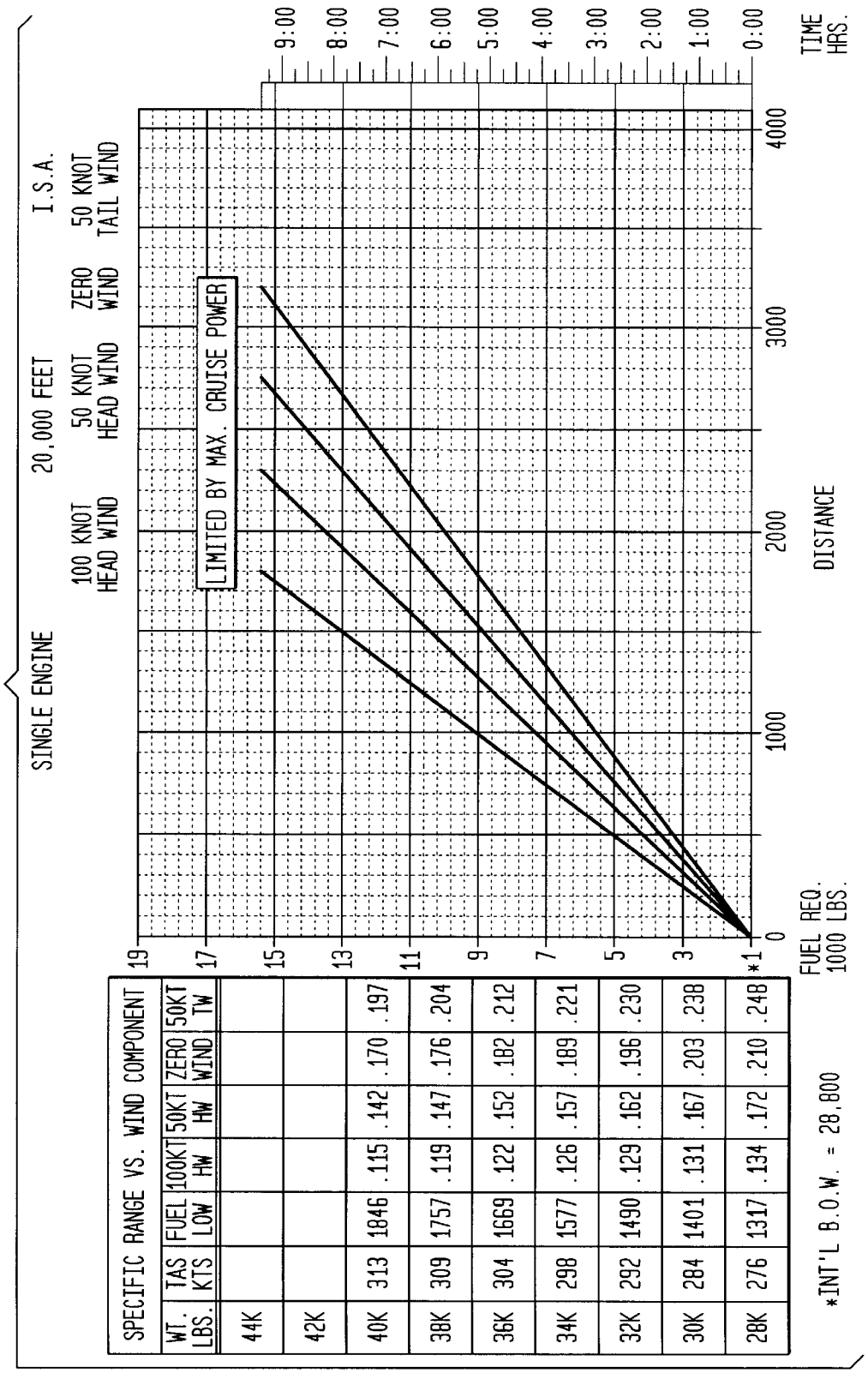

After a real emergency while in flight, the crew would have to manually redo the calculations based on an ETP where the emergency actually occurred. If there is a sole pilot, this can present significant problems, having to both control the jet and make iterative calculations. For example, FIGS. 7A and 7B are tables showing the performance curves for General Electric CF34-3A engines at FL 250 (7A) and FL 200 (7B). In particular, on the grid, the distance (SR) in nautical miles is given; on the left abscissa is the fuel required (in pounds) and on the right abscissa is the ETE in hours. On the graph are four lines, the engine performance based on different wind conditions; from the left a 100 knot headwind, a 50 knot head wind, zero wind, and a 50 knot tail wind. Assume an emergency/catastrophic decompression of the cabin occurs. Based on FIGS. 7A and 7B (and, in reality, additional charts for different FLs above FL 100) the pilot must determine the proper FL to safely reach a diversion airport. Assume, for example, the shortest distance to the diversion airport is 500 nm (nautical miles) and there is a 50 knot headwind. The pilot could fly at FL 250, in which case the ETE is about 2:07 and the fuel requirement is about 3500 lbs. The pilot must then refer to the chart in FIG. 5A, which indicates that the crew requires about 1122 liters of oxygen (interpolating) and if there are four passengers on board they will require an additional 1453 liters (interpolating using the chart on FIG. 6A), so a total of 2575 liters of oxygen are required for this flight level. If there is insufficient oxygen available, the pilot must pick a different FL and redo the calculation. Assume the pilot then tries FL 200, in which case is the ETE would be about 2:20 hours and the fuel requirement would be about 3900 lbs. The pilot must then turn to FIG. 5B, which shows that this flight time requires about 912 liters of oxygen for the pilots, and with the same four passengers on board they will require an additional 1369 liters (interpolating using the chart on FIG. 6A), so a total of 2281 liters of oxygen are required for this flight level. Note that at the lower FL the oxygen requirement is less but the fuel requirement is greater. The pilot must do a balancing act using an iterative technique, and all while still flying in a certain direction (which depletes the fuel and oxygen resources).

Preferred Automated System

A system in accordance with the invention, when associated with a pressurized gas supply having a predetermined initial gas pressure defining a predetermined initial number of liters of gas, preferably corrected for temperature as gas is being drained from the supply acts determines the estimated time existing for use of the gas. The system updates the data, preferably in real time, to provide an indication to the pilot(s) of the oxygen remaining. A more preferred system determines a suitable operating window for flying after emergency decompression of the jet cabin.

In FIG. 1 there is shown a basic system in accordance with the invention adapted to monitor the drain of oxygen in a pressurized supply 10 installed on a jet plane. Oxygen drawn from this supply is fed to the interior 11 of the plane only when it flies at high altitudes, at which time it becomes necessary to supply oxygen to the pilot of the plane. Interior 11 therefore represents the cabin (and flight deck) of the jet plane. By way of example, we shall assume that the jet plane is a Falcon 50 having installed therein a single oxygen cylinder having a 76.6 cubic feet capacity. This cylinder, when full, at take-off, contains 2168 liters of oxygen under a pressure of 1850 psi. A typical cylinder-mounted pressure regulator valve for draining gas from the cylinder has an integral shut-off valve as well as an unused port on its high pressure side. Mounted on this port is a pressure transducer 12 which translates the gas pressure to a voltage V1 whose magnitude is proportional thereto. A suitable pressure transducer for this purpose is the model PX 176 Series 0-3000 psi transducer produced by Omega Engineering Inc. which has an analog output in the 1 to 6 volt DC range. Coupled to transducer 12 is an integrated-circuit pressure-to-liters module 13 that converts the voltage yielded by the transducer that depends on the pressure of the supply to a voltage V~ proportional to the number of liters of oxygen in the supply. The relationship between oxygen pressure and liters of oxygen is based on the formula that 100 cubic feet of oxygen, at a pressure of 1850 psi, equals 2850 liters. The oxygen supply on the plane is in an environment whose temperature varies; hence an increase in temperature produces an increase in the internal supply pressure. In order therefore to provide temperature correction, the temperature of supply 10 is sensed by a probe 14 which in practice may be a thermocouple whose output voltage rises and falls with variations of temperature. The output of probe 10 is applied both to a temperature compensator 15 coupled to the output of pressure transducer 12 and to a temperature compensator 16 coupled to the output of pressure-to-liters module 13. Hence yielded by compensator 15 is a temperature-corrected pressure signal $S_1$, while yielded by compensator 16 is a temperature- corrected liters signal $S_2$ For a known quantity of oxygen in the supply, the time remaining until the supply is depleted (hereinafter referred to as "oxygen duration") is computed by dividing the initial quantity of oxygen expressed in liters by its rate of depletion in a unit of time consumption rate in (liters per minute). This computation affords a direct reading of time remaining before the oxygen supply is exhausted. Signal $S_1$ from temperature compensator 15 is applied to a pressure lapse rate module 17. Module 17 periodically samples pressure signal to yield a pressure lapse-rate signal $L_1$. By lapse rate is meant the rate, per unit of time, (one minute) at which the pressure of oxygen in the supply decreases as oxygen is drained from the supply. Obviously the rate of drain is greatest when a given plane is filled to its capacity by passengers. Signal $S_2$ from temperature compensator 16 is applied to a lapse rate module 18 which determines the rate, per unit time, at which liters of oxygen in the supply are being drained therefrom. Module 18 periodically samples this rate to yield a liters lapse rate signal $L_2$. The pressure lapse rate signal $L_1$ and the concurrently produced liters lapse rate signal $L_2$ are applied to the input of a microprocessor 19 in which the signals are digitalized and then processed to provide the following readouts which are displayed in the cockpit or flight deck 20 of the plane so that they can be seen by the pilot and the flight crew.

Readout P presents the existing pressure of oxygen as oxygen is drained from supply 10 when the plane is flying at high cabin altitudes. Thus when the supply is full, it typically will have a pressure of 1850 psi, and in the course of the flight, it will drop progressively until the oxygen supply is depleted and meter P reads zero psi. Readout L indicates the number of liters of oxygen remaining in the supply. If therefore when the supply is fill, it has 2168 liters of oxygen, readout L will so indicate, and as the oxygen is being drained, readout L will decrease until the oxygen is exhausted and no liters remain in the supply. In reality, usefull oxygen supply ends when the pressure decreases below 200 psi. The indications to the pilot of P and/or L can be biased to provide a more accurate reading (e.g., rather than the pilot, during an emergency, having to subtract 200 psi from a pressure reading to determine the useful oxygen available).

But as noted previously, the prevailing pressure of the supply and the number of liters of oxygen therein do not indicate "oxygen duration," the time remaining before the oxygen is depleted, for this depends on the rate per unit time at which the oxygen is being drained, which rate is a function of the number of passengers and crew being supplied with oxygen. Hence the number of passengers and crew must be factored into the computation to produce the third readout D which is the Oxygen Duration (which can likewise be compensated for the 200 psi minimum).

Microprocessor 19 is provided with a keyboard 21 by which is entered into the data base of the computer the identification of the plane, the number of liters of oxygen in the supply when full, and the internal pressure of the supply initially.

To make it possible for the same system to provide readings of oxygen duration, prevailing pressure and remaining liters readings for a broad spectrum of different commercial jet planes, the computer may be provided with software 22 in the form of a CD-ROM, ROM, EPROM, EEPROM, hard disk or the like, in which is digitally stored a plurality of charts, the data on each chart being appropriate to a respective jet plane and being entered into the data base. From software 22 the system will derive information for producing a static display. For example, if passenger seats are added or removed, or if the pilots' masked are changed to one having different flow characteristics, the ROM-type memory can be changed, or the information can be modified from the keyboard using a removable medium (e.g., the CD-ROM) with the correct data. Preferably, data stored on a rotatable median (e.g., CD-ROM, hard drive) is loaded into working memory (RAM) for normal operation to avoid problems with the storage device effecting calculations.

When no oxygen is being consumed, it is then desirable that the system present a static display based on a predetermined projection or forecast which takes into account the number of passengers and crew on board the plane, and an estimated oxygen consumption rate for the particular system. Thus when no oxygen is being consumed, the display is in its "static" mode, while when oxygen is being actually drained from the supply, the system is then in a "dynamic" mode. Alternatively, the system may only have a dynamic mode; for example, indicating oxygen usage when neither the crew nor passengers is using oxygen, as an indication of a leak (e.g, in the manifold, or a faulty regulator for the canister).

It must be borne in mind that the system is not limited to use when oxygen is being drained from the supply at high cabin altitudes, for it is applicable to whenever oxygen is being consumed. For any particular flight it is important that the supply of oxygen for that flight not run out.

A more preferable system uses the aforementioned microprocessor and includes additional inputs and provides a graphical readout to the pilot(s). FIGS. 8–12 were each generated using an EXCEL brand spreadsheet program (Microsoft, Inc., Redmond, Wash.), although the programming can be otherwise (e.g., a database program, or hardwired, or in ROM as would be readily apparent As mentioned earlier, a pilot should calculate the oxygen requirements based on the ETP, a worst case scenario. For a flight from New York to London, the nearest diversion airports are Shannon, call letters EINN (in Ireland) and Gander, call letters CYQX (in Newfoundland, Canada). FIG. 8 depicts the ETPs for various FLs between the two airports; the distance, 1715 nautical miles, is shown in the uppermost right portion. The reader should note that the ETP varies at different flight levels, as do the ground speeds (GSR, GSC), distances, and times to return, due to different wind speeds at different altitudes and different engine performance characteristics due to those wind speeds and altitudes.

Prior to departing on such a flight, the pilot should enter into the system the characteristics required for the two diversion airports at ETP; preferably, the system database will maintain a list of airports and, together with existing instrumentation, calculate the proper course for diversion flight.

Figure 9:
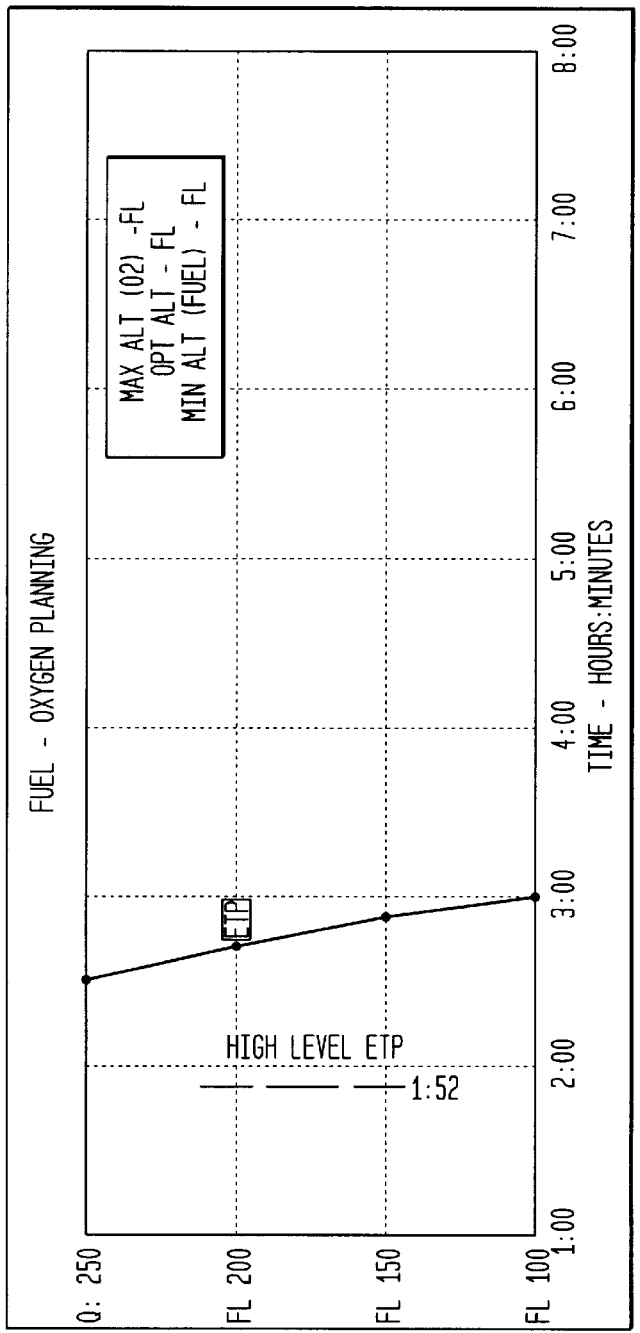
FIG. 9 is a graphical display, such as on a computer readout, of ETP as a function of cardinal altitude.
Figure 10:
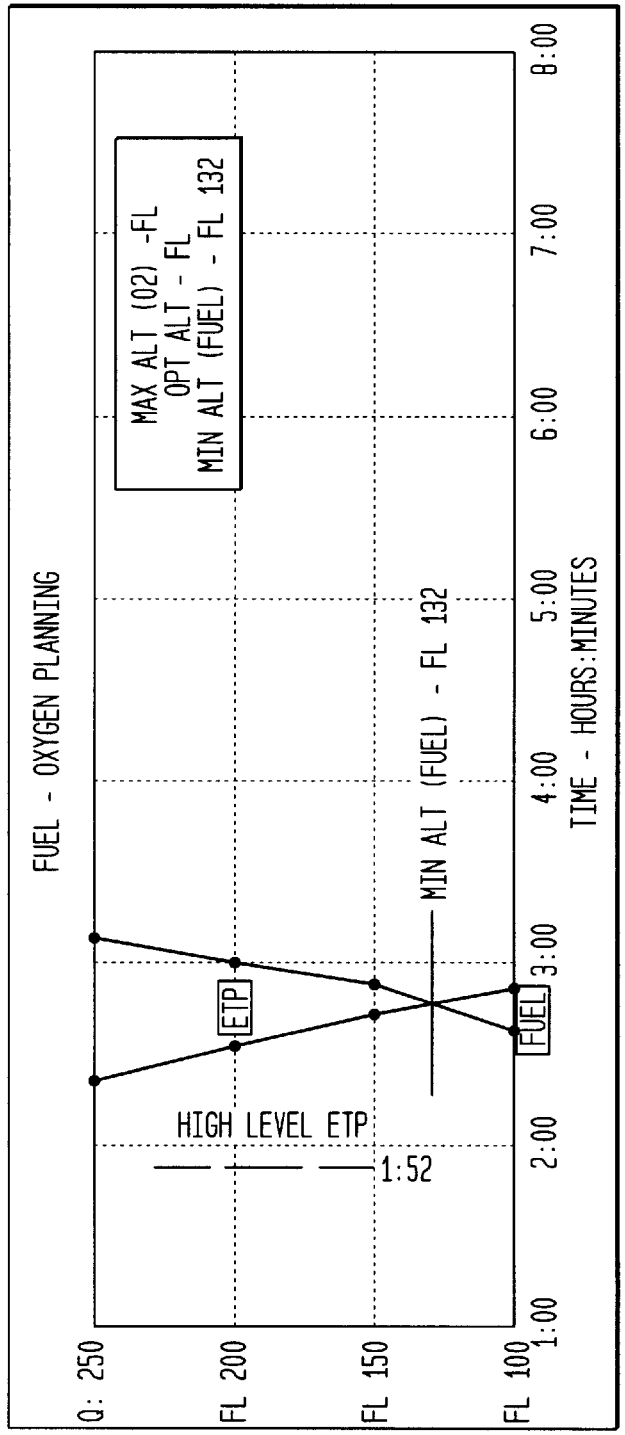
FIG. 10 is a graphical display, such as on a computer readout, of the ETP in FIG. 9 plus fuel duration as a function of time and altitude.

FIG. 9 depicts the ETP at different flight levels; note that the ETP decreases as flight level increases. Also shown in the high level (FL 410) ETP of 1:52. FIG. 10 superimposes on FIG. 9 the fuel variable, ascending to the right. The amount of fuel must be to the right of the ETP line to complete the journey; a fuel level to the left of the ETP line does not provide sufficient flight time to safely reach a diversion airport. Also shown, preferably, is an indication of the minimum altitude at which the jet can fly because a lower flight level consumes more fuel; this point is the intersection of the ETP and the Fuel lines on the chart.

Figure 11:
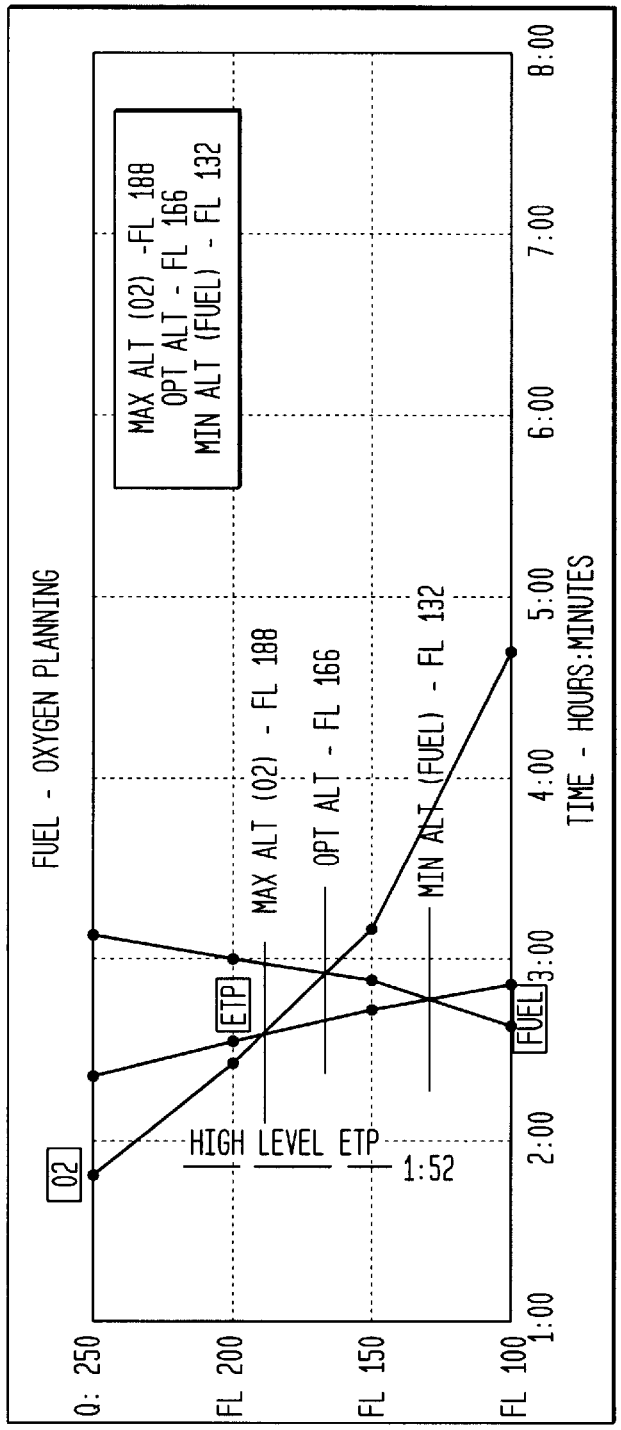
FIG. 11 is a graphical display, such as on a computer readout, of the display shown in FIG. 10 with the addition of oxygen duration as a function of time and altitude, and including an operating window with a suggested altitude for conservation of fuel and oxygen resources.

FIG. 11 superimposes on FIG. 10 the oxygen available, such as by use of the system shown in FIG. 1; FIG. 11 is the preferred type of graphical representation displayed in the cockpit. The pilot should also input to the system at the time of departure the number of pilots, the number of passengers, and the number (if any) of passengers on therapeutic oxygen. As shown at the bottom of FIGS. 8–12, there is a crew of three with one on regulated oxygen, and their supply is 2639 liters at 1500 psi; the regulation is on demand rather than supply ("OXYGEN SYSTEM (D/S)" in the figure). There are 12 passengers including one on therapeutic oxygen, and their supply is 5278 liters at 1500 psi. Also shown at the bottom is the fuel at the ETP, the desired reserve fuel (3000 lbs.), the aircraft weight, and the type of engine(s). Assuming there were a sudden decompression of the cabin, the chart shows that the jet must fly at a flight level above the intersection of the ETP and Fuel lines to have sufficient fuel (FL 132, preferably indicated as shown in the figure), it must fly at a flight level below the intersection of the $O_2$ and ETP lines (otherwise the oxygen will run out before the time (ETP) required to reach the diversion airport; here FL 188, preferably as shown in the figure), and it must have an ETE to the left of the intersection of the $O_2$ and Fuel lines (otherwise there will be insufficient fuel; here about 2:50, which can also be shown on the display if desired). Note that a flight time can be longer than the ETP; the ETP is the minimum time needed to reach a diversion airport. Thus, as shown in FIG. 11, under these emergency conditions the pilot must maintain the aircraft between FL 188 and FL 132 to have sufficient fuel and sufficient oxygen to reach the diversion airport. The pilot could vary this scenario by changing the desired amount of reserve fuel. In the most preferred embodiments, an optimum altitude, the intersection of the Fuel and $O_2$ lines lines, is displayed (here FL 166); from this flight level, the pilot can still climb (such as to avoid bad weather) or descend. Preferably the display of each of the ETP, Fuel, and $O_2$ lines on the display is in a different color, and most preferably the operating window is shown in a different color from the background.

Figure 12:
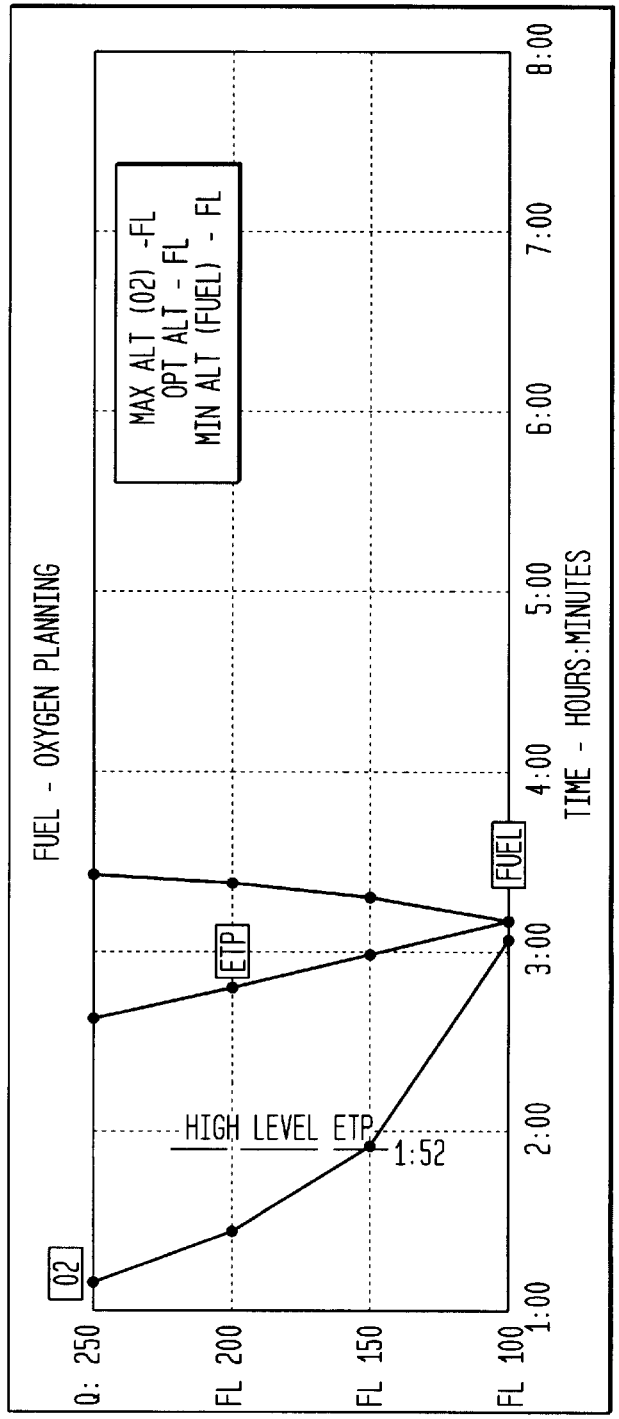
FIG. 12 is a graphical display, such as on a computer readout, of a display analogous to that shown in FIG. 11 where there is insufficient oxygen to fly above FL 100 and sufficient fuel to fly at FL 100 to a diversion airport.

FIG. 12 is the same as FIG. 11 but calculated for a different engine type. Note that there is insufficient oxygen for a flight level above FL 100. However, there is sufficient fuel to maintain the diversion destination at FL 100, a level where oxygen is not required.

As seen, the present invention greatly simplifies the pilots' decisions in an emergency situation and eliminates the time-consuming, error-prone, iterative and interpolative calculations pilots would normally have to perform to safely alter their flight plan. Because a person can become unconscious immediately upon sudden depressurization (the "expected" five to eight seconds of aware activity may not be sufficient and is not a safety margin due to the individual-specific reaction upon such an event), the present system can be integrated with an autopilot: a pressure sensor, such as activates passengers' emergency oxygen, can determine when sudden depressurization has occurred and the plan can descend automatically to a desired flight level within the operating window (because descent to FL 100 and ascent to a desired flight level can waste fuel, which may be a limiting resource).

For new aircraft, the present system is preferably built in with a non-volatile memory having the pre-programed therein the characteristics of the engine and the oxygen system. For existing aircraft the present system can be integrated with a CD-ROM reader to input information for that particular aircraft. All systems can include the capability to read removable media to facilitate inputting changes to the engines and/or oxygen system.

In another preferred embodiment, the performance charts (e.g., FIGS. 7A/B) are also displayed. On the left hand portion of each figure is a table labelled "Specific Range vs. Wind Component" and is based on the International B.O.W. (basic operating weight). Of course, a jet may have additional supplies (ranging from a collapsible tow bar for smaller airports not accustomed to receiving jets, to deicing fluid for winter travel) to emergency equipment (life rafts, flares, water, food) to additional normal rations (food, liquor). This additional equipment must be added to the B.O.W. to arrive at the weight (in pounds) shown in the table. The table shows that at a given weight, the TAS (true air speed) and fuel flow expected for a given weight; the decimal value is the distance (in nautical miles) that would be expected per pound of fuel for a given wind speed (head/tail wind or no wind); multiplied by the amount of fuel, this value provides the SR of the jet. Thus, in one instance, the chart and the graph can be displayed (simulataneously or alternately) to the pilot, and the pilot can check that data with the actual TAS and fuel flow to evaluate the existing characteristics of the jet. Also, preferably the chart listings for a given wind speed are provided in the same color as the lines on the graph for the same wind speed.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A system for determining a safe flight level in an aircraft having a pressurized oxygen supply, comprising:
   a pressure transducing system sending a data signal indicative of the pressure in the oxygen supply;
   means for providing a data signal indicative of the amount of fuel in the aircraft;
   computer data storage for maintaining aircraft engine performance data and equal time point (ETP) data between two predetermined diversion airports;
   a compute processor receiving said pressure and fuel data and calculating (i) fuel usage versus time as a function of the engine performance data, (ii) oxygen usage versus time as a function of altitude, and (iii) ETP versus time as a function of altitude; and
   a screen for graphically displaying (i), (ii), and (iii) superimposed.

2. The system of claim 1, further comprising means for inputting to said computer data storage the number of crew members, the number of crew members on regulated oxygen, the number of passengers, and the number of passengers on therapeutic oxygen.

3. The system of claim 1, wherein the processor calculates and the screen displays the minimum safe flight level.

4. The system of claim 1, wherein the processor calculates and the screen displays the maximum safe flight level.

5. The system of claim 1, wherein the processor calculates and the screen displays an optimum safe flight level.

6. The system of claim 3, further comprising means for inputting the calculated value to an automatic pilot.

7. The system of claim 4, further comprising means for inputting the calculated value to an automatic pilot.

8. The system of claim 5, further comprising means for inputting the calculated value to an automatic pilot.

9. A jet aircraft having the system of claim 1.

10. The system of claim 1, further comprising means for inputting to said computer processor an amount of reserve fuel.

11. A method for determining a safe flight level in an aircraft having a pressurized oxygen supply, comprising:
    providing a computer processor with display and interface;
    transducing the pressure in the pressurized oxygen supply and providing a signal to the computer indicative of the pressure;
    providing as input to the computer at least one of (a) a transduced signal indicative of the amount of fuel in the aircraft and (b) a manually input value indicative of the amount of fuel in the aircraft and optionally a reserve fuel quantity;
    storing as data aircraft engine performance data and equal time point (ETP) data between two predetermined diversion airports;
    transducing the altitude of the aircraft and providing a signal to the computer indicative of the altitude;
    calculating in said computer processor (i) fuel usage versus time as a function of the engine performance data, (ii) oxygen usage versus time as a function of altitude, and (iii) ETP versus time as a function of altitude; and
    displaying on said computer display (i), (ii), and/or (iii), optionally superimposed.

12. The method of claim 11, wherein the fuel level input is a transduced signal.

13. The method of claim 11, comprising displaying (i), (ii), and (iii) superimposed.

14. The method of claim 13, comprising displaying only the operating window, if any, formed by (i), (ii), and (iii).

15. The method of claim 11, further comprising storing passenger and crew regulator oxygen data.

16. The method of claim 11, wherein (i), (ii), and (iii) are all displayed in different colors.

17. The method of claim 16, the operating window is displayed in a different color.

* * * * *